(12) United States Patent
Steinke

(10) Patent No.: US 6,971,426 B1
(45) Date of Patent: Dec. 6, 2005

(54) ELASTOMERIC TIRE WITH ARCH SHAPED SHOULDERS

(75) Inventor: Richard A. Steinke, Boulder City, NV (US)

(73) Assignee: Amerityre, Boulder City, NV (US)

(*) Notice: Subject to any disclaimer, the term of this patent is extended or adjusted under 35 U.S.C. 154(b) by 222 days.

(21) Appl. No.: 10/856,652

(22) Filed: May 28, 2004

(51) Int. Cl.[7] .............................. B60C 5/01; B60C 3/00; B60C 3/04; B60C 9/18; B60C 17/00
(52) U.S. Cl. ........................ 152/452; 152/327; 152/454; 152/516
(58) Field of Search ............................. 152/452, 454, 152/516, 327

(56) References Cited

U.S. PATENT DOCUMENTS

| | | |
|---|---|---|
| 450,816 A | 4/1891 | Overman |
| 464,767 A | 12/1891 | Woodward |
| 612,583 A | 10/1898 | Davidson |
| 684,157 A | 10/1901 | Williams |
| 1,004,480 A | 9/1911 | Seward |
| 1,004,481 A | 9/1911 | Seward |
| 1,014,318 A | 1/1912 | Merriman |
| 1,056,976 A | 3/1913 | Divine |
| 1,178,887 A | 4/1916 | Thoens |
| 1,194,177 A | 8/1916 | Henderson |
| 1,670,446 A | 5/1928 | Gammeter |
| 1,670,721 A | 5/1928 | Hitchner |
| 1,707,014 A | 3/1929 | Hopkinson |
| 1,940,077 A | 12/1933 | Coe |
| 2,779,380 A | 1/1957 | King et al. |
| 3,329,192 A | 7/1967 | Roque |
| 3,533,662 A | 10/1970 | Richards et al. |
| 3,888,291 A | 6/1975 | Herzlich et al. |
| 3,948,303 A | 4/1976 | Patrick |
| 4,230,169 A * | 10/1980 | Boileau et al. ............. 152/452 |
| 4,305,446 A * | 12/1981 | Brown et al. ............... 152/452 |
| 4,855,096 A | 8/1989 | Panaroni |
| 4,943,223 A | 7/1990 | Panaroni |
| 5,229,047 A | 7/1993 | Becker |
| 5,524,913 A | 6/1996 | Kulbeck |
| 5,906,836 A | 5/1999 | Panaroni |
| 5,988,764 A | 11/1999 | Deetz |
| 6,145,937 A | 11/2000 | Chen |
| 6,165,397 A | 12/2000 | Panaroni |
| 6,186,598 B1 | 2/2001 | Chen |
| 6,279,631 B1 | 8/2001 | Tuggle |
| 6,318,428 B1 | 11/2001 | Lo |
| 2003/0205306 A1 * | 11/2003 | Steinke ....................... 152/327 |

FOREIGN PATENT DOCUMENTS

| | | |
|---|---|---|
| FR | 338920 | 7/1904 |
| GB | 2367-1878 | 6/1878 |
| GB | 3432-1881 | 8/1881 |
| GB | 11800 | 7/1889 |
| GB | 20186 | 9/1900 |
| GB | 27224 | 12/1902 |

* cited by examiner

Primary Examiner—Adrienne C. Johnstone
(74) Attorney, Agent, or Firm—M. Reid Russell

(57) ABSTRACT

An elastomeric tire with arch shaped shoulders for mounting onto a rim that is manufactured by spin casting or molding methods that includes an annular cavity that is centered under the tire tread having equal thicknesses of side walls and an area under the tread whose slope outwardly into shoulder that the side walls upper ends intersect that have greater thickness and which side walls lower ends include beads that are each spaced a selected distance from the surfaces of the side wall ends that slope upwardly from inner to outer surfaces and with the tire preferably including plies that extend across the tire having ends that wrap around the beads and belts fitted around the tire circumference, above the plies, and including porous spacers fitted between the layers of plies and belts to pass a flow of the elastomeric material therethrough during tire formation.

8 Claims, 7 Drawing Sheets

ELASTOMERIC TIRE WITH ARCH SHAPED SHOULDERS

BACKGROUND OF INVENTION

1. Field of the Invention

This invention pertains to non-pneumatic tires for mounting onto a rim as a component of a wheel, and particularly to a tire that is formed, preferably by spin casting methods, from an elastomeric material, having a center annular cavity formed to give the tire at atmospheric pressure the capability to safely support a design load.

2. Prior Art

The present invention is in a new transport tire that is simple in design and constitutes a major improvement in the passenger car tire industry. The tire of the invention with low pressurization will exhibit the ride and wear characteristics of, or are better than that of, a conventional pneumatic tire, that is intended for a like use to the tire of the invention. The tire of the invention has an inherent load bearing capability, even without air, and with a low pressure of air provides the equivalent of the load bearing capability of a fully aired, like size, pneumatic tire. With, without air, the tire of the invention will still provide load bearing support to a vehicle on which it is mounted for a significant number of miles of travel at fifty miles per hour and greater, enabling the vehicle operator to move the vehicle to a service area.

Elastomeric, solid, cavity free, non-pneumatic tires have been used for many years going back to as early as 1878, as set out in a British Patent No. 2,367, that shows a solid rubber tire and rim. Even where such rubber tires have been formed to include inner cavities, as illustrated in U.S. Pat. Nos. 450,816 and 464,767 such have not considered the relationship between the tire inner and outer wall thickness, to the tire shoulders, and from the tire shoulders thickness to the thickness under the tread, as does the invention, for carrying different loads, and with cavities of some of the wheels of the 464,767 patent outer surfaces shown as being uniform thickness unlike the side walls, shoulders and section under the thread that have a specific thickness relationship and with the tire section above the beads being formed to engage the rim top edges, as called for in the invention. While solid rubber tires having cavities are also shown in U.S. Pat. Nos. 612,583; 684,157; and 1,670,446, the cavities of these patents are circles or modified circles and they do not include any recitation of a relationship in any of the embodiments where the side walls are supported by rim edges, as called for by the invention. Further, while a U.S. Pat. No. 1,014,318 shows, in FIG. 1, a tire having an arch shaped cavity and with the tire side wall ends maintained between hook ends of a rim, with the patent directed to rim configurations only and there is no discussion of a relationship between load bearing capabilities as relates of wall thickness between the inner and outer wall, shoulders and section under the tread surfaces. Finally, while cavities are shown in the wheels of U.S. Pat. Nos. 3,948,30; 5,524,913; 5,988,764; 6,145,937; 6,186,598, and 6,318,428, these patents are directed to tire mountings to a rim, or, as in U.S. Pat. No. 2,779,380 to a tubeless tire; in U.S. Pat. No. 3,329,192 to a cross bar tire mounting, or in U.S. Pat. No. 6,279,631, to a low pressure tire, and there is no discussion of loading bear capabilities of the tire and wheel arrangements, as shown, in conjunction with the uniquely shaped interior cavity. Only the present invention recognizes the load bearing capabilities of an elastomeric tire having a uniquely shaped annular cavity and side wall ends located above the encapsulated beads that are supported to the rim edges for providing load bearing capabilities at low air pressure like those of a conventional pneumatic tire that is fully aired. Which tire of the invention will maintain load bearing capability to safely support a vehicle even at ambient or atmospheric pressure for a significant distance at speeds of fifty miles per hour and even greater.

A number of later patents that also show non-pneumatic tire and tire and rim combinations include, for example, British Patents No.'s 3,432; 20,186; and 27,224, French Patents No.'s 338,920 and 367,981 and U.S. Pat. Nos. 1,056,976; 1,178,887; 3,533,662 and 5,229,047. Which patents, however do not show a tire with an annular cavity that is like that of the invention. Further, non-pneumatic tires that do not include a center cavity are shown in earlier U.S. Pat. Nos. 4,855,096; 4,943,323, 5,906,836 and 6,165,397 that were co-invented by the present inventor. Nor does the currently pending U.S. patent application Ser. No. 10/412,471, filed Apr. 9, 2003, show the unique cavity configuration of the tire of the invention. Additionally, other earlier patents covering non-pneumatic tires that include inner cavities that are not arch shaped, are shown in early British Patent No.'s 11,800 and 14,997; along with early U.S. Pat. Nos. 1,194,177 and 1,670,721. Such cavities are set out as for allowing compressions of the tire side walls and bead sections so as to allow the tire to be fitted into a rim, and for cushioning, and where such cavities have provided load bearing capabilities, like those shown in early U.S. Pat. Nos. 1,004,480 and 1,004,481, such have not been cast tires like that of the invention. None of which solid non-pneumatic tires, have included a uniquely shaped annular cavity to afford the tire with a load bearing capability as governed by wall thickness like that of the invention. Similarly, tires, as shown in U.S. Pat. Nos. 1,707,014; 1,940,077 and 3,888,291, do not provide load bearing when the tire is depressurized to approximately atmospheric pressure as does the tire of the invention.

It is, of course, well known that non-pneumatic tires, such as those shown in some of the above cited prior art patents, have the advantage of not going flat. Heretofore, however, this advantage has not outweighed the better cushioning and shock absorbing characteristics presented by a pneumatic tire as well as the fact that solid tires, whether formed from rubber, urethane, or the like, tend to build up heat through hysteresis flexure when supporting a significant load. Pneumatic tires generally have less mass than a comparable non-pneumatic tire and their internal cavity tends to dissipate heat. The tire of the invention is preferably formed by spin casting methods to include the uniquely shaped annular cavity that, dependent upon the rim configuration, can be air retaining and, accordingly, like the pneumatic tire with its open interior, will not experience a damaging heat build-up under a significant load.

The uniquely shaped cavity of the invention provides a tire that will transfer loads uniformly from the tread through the tire shoulder and side walls and into a rim whereto the tire is mounted. The load as the tire will maintain when aired to a low pressure is determined by the width or thickness of the tire from the juncture of the walls and rim to each of the shoulder and under the tread, and, as needed to maintain a greater load the thickness can be uniformly increased, and, if the tire has not been punctured, the tire can be aired to a greater pressure. With, should the tire loose air, it will still support its design load for a significant distance and at a speed of at least fifty miles per hour and greater. Also, while not required for some applications, the tire of the invention will preferably include beads for maintaining it onto a rim, and for use as a transport tire, can include side wall plies and, tread reinforcement with a belt or belts that can be included in the tire during the manufacturing process.

SUMMARY OF THE INVENTION

It is a principal object of the present invention to provide an elastomeric tire formed by molding methods, preferably by spin casting, that is capable of supporting a vehicle at low air pressure and will continue to safely support that load without air for a significant distance at a speed of fifty miles per hour and greater.

Another object of the present invention to provide an elastomeric tire formed by molding methods, preferably by spin casting, to include a uniquely shaped annular cavity where the cavity is centered under the tire tread to provide structural and includes side walls and the area under the tread of like thickness and has an increased thickness at the tire shoulder, providing a tire that will support, and safely transfer loads, from the tire tread through the side walls and into the rim, supporting the tire under load at low pressure, and with air in the annular cavity at ambient or atmospheric pressure, will continue to support a design load for a significant distance at a speed of fifty miles per hour and greater.

Another object of the present invention is to provide an elastomeric tire having a center annular cavity where the tire side walls have a uniform thickness and taper outwardly from a first thickness to a second thickness at the tire shoulder and with the annular cavity then tapering inwardly at the curve of the shoulder junction with the area under the tire tread back to the first thickness that continues across the tire area under the tire tread.

Still another object of the present invention is to provide an elastomeric tire where the annular cavity formed where the tire side walls and tire area under the thread have a like uniform thickness, and with the that thickness increased at the curve of the junction with the tire shoulders to a second thickness that is uniform around each shoulder, and which first and second thicknesses selected for the anticipated load as the tire is designed to carry.

Still another object of the present invention is to provide an elastomeric tire that is preferably formed by molding methods, preferably by spin casting, in a range of sizes with the tire with inelastic beads encapsulated in the side wall rim engaging ends, with the tire to have an inherent strength when un-pressurized that is governed by the side walls and area under the tread thickness, and thickness at tire shoulders to support the load carried by the tire, that, when aired to a low pressure, will duplicate or improve upon the performance of a pneumatic transport tire constructed to carry a like load.

Still another object of the present invention is to provide a tire wherein beads are encapsulated at the side wall rim ends, and whose inherent load supporting characteristics can be enhanced by an inclusion of plies and belts that are positioned into a tire mold and become encapsulated in the tire during casting of the tire.

Still another object of the present invention is to provide plies and belts formed from rayon or cotton cord that are maintained in spaced apart relationship on an mandrel surface of a cavity mold to receive a flow therearound in the casting process, encapsulating the plies, belts and beads in the finished tire.

The present invention is in a unique elastomer tire that is formed by molding methods, preferably spin casting, from natural or synthetic rubber, urethane, or the like, with a spin casting process, or processes, like those set out in U.S. Pat. Nos. 4,855,096; 4,943,323; 5,906,836, and 6,165,397, that the present inventor is a joint inventor of, and improvements thereto being suitable for forming the tire of the invention. The mold for which spin casting process can receive a package of beads, plies and belt or belts that are supported in the mold to receive a flow of the urethane material directed therein as the mold is spun, forming the tire containing beads, plies and belts. The formed tire has an annular cavity therein where the side walls and the area of the tire under the tread are of a like thickness and which thickness is increased at a curved intersection of the side walls and area under the tread, or the tire shoulders. In practice, for a finished tire, a side wall and area under the tread thickness of approximately 0.700 inches, and a shoulder thickness of approximately 0.800 inches has been found to support a load of approximately twelve hundred (1200) pounds directed into the center of the tread area. Which side wall and area under the tread and shoulder thickness are increased by 0.125 inches to a thickness of 0.825 inches and 0.925 inches, respectively, to support a two thousand pound (2000) load directed into the center of the tread, and are increased by an additional 0.100 inch to the side walls, and 0.075 to 0.100 to the shoulders, for a total of 0.925 and 1.000 to 1.025 inches, respectively, to support a load of approximately three thousand pounds (3000) pounds directed into the center of the tread.

The tire of the invention preferably includes a pair of annular beads that are each encapsulated in the rim engaging wall end that tapers inwardly from a rim hook end engaging section, providing a shelf that engages the top of the rim, supporting the tire side walls. With the side wall lower ends formed to snugly fit into the rim, providing a seal therein and resist an outward passage of air. In practice, the tire manufactured with beads when fitted onto a rim that is aired to a low pressure of from fifteen (15) to twenty (20) Psi provides a tire having as good as or better ride and wear qualities as that of a conventional pneumatic tire and, and can be aired to greater pressures dependant upon load. With, should a loss of pressure occur, the tire will still maintain its design load for a substantial distance to be at one hundred (100) miles and greater, traveling at a speed of around fifty (50) miles per hour. Of course, the tire can also include plies and one or more belts to give it greater load bearing strength. Which plies and belt or belts can, in practice, reduce the side walls, area under the tread, and shoulders thicknesses, while still maintaining the tire load carrying ability.

Still other benefits and advantages of the invention will become apparent to those skilled in the art to which it pertains upon a reading and understanding of the following detailed specification.

DESCRIPTION OF THE DRAWINGS

The invention may take physical form in certain parts and arrangement of parts, and a preferred embodiments of which will be described in detail in this specification and illustrated in the accompanying drawings which form a part hereof.

DETAILED DESCRIPTION

Figure 1:
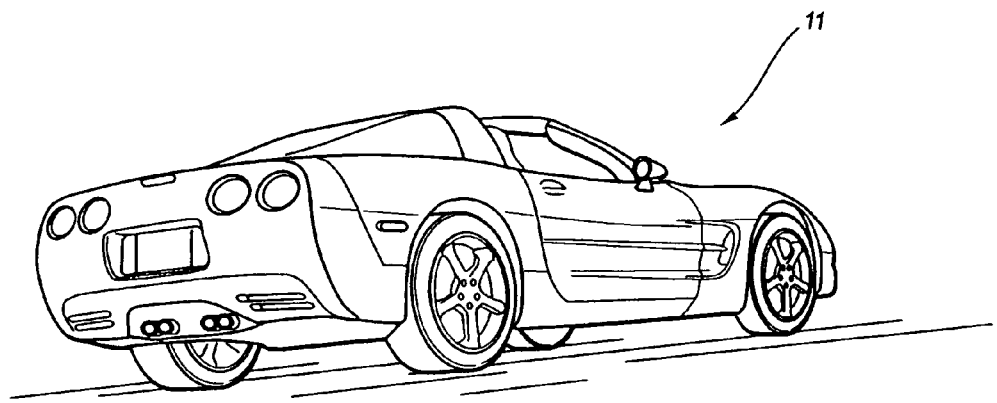
FIG. 1 shows a perspective view taken from a right side and rear end of a high performance sports car mounting a tire of the invention.
Figure 2:
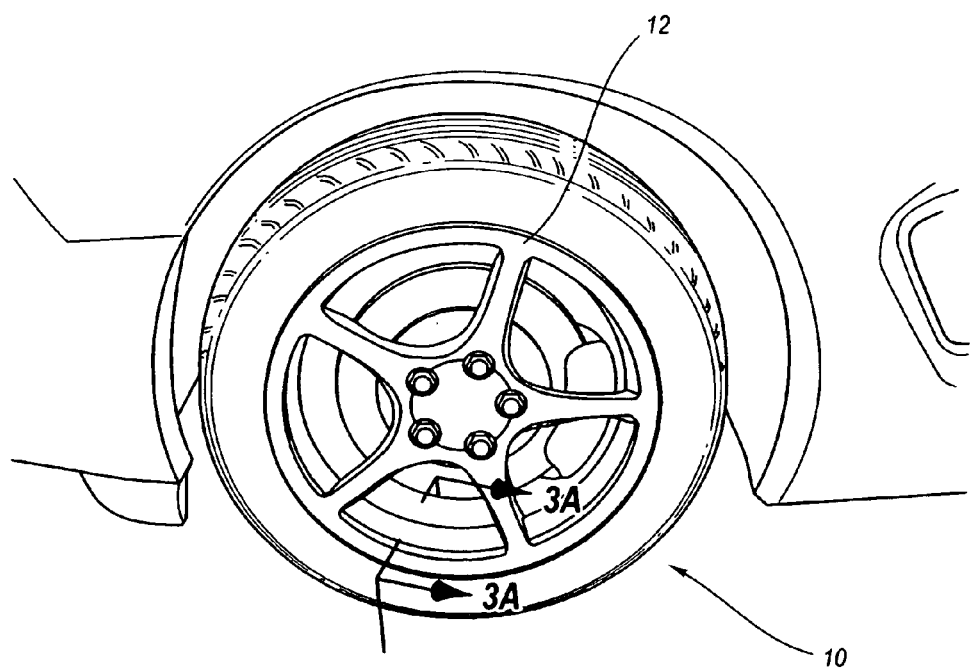
FIG. 2 shows a perspective view taken from the side and above a rear tire of the sports car of FIG. 1.
Figure 3A:
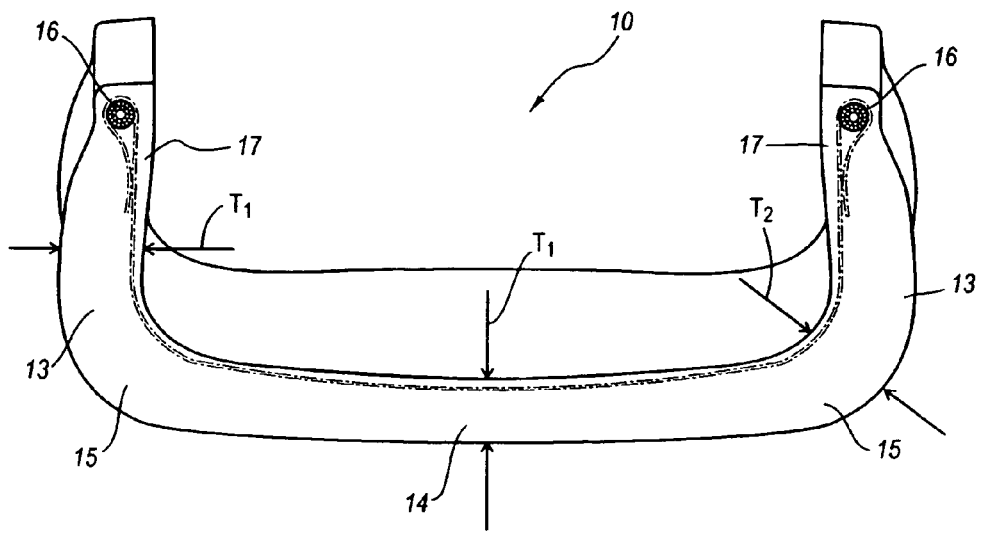
FIG. 3A shows a section of the tire of the invention taken at the line 3A—3A of FIG. 2 showing with arrow T1 the thickness of the tire side walls and with arrow T2 the thickness of the tire shoulders.
Figure 3B:
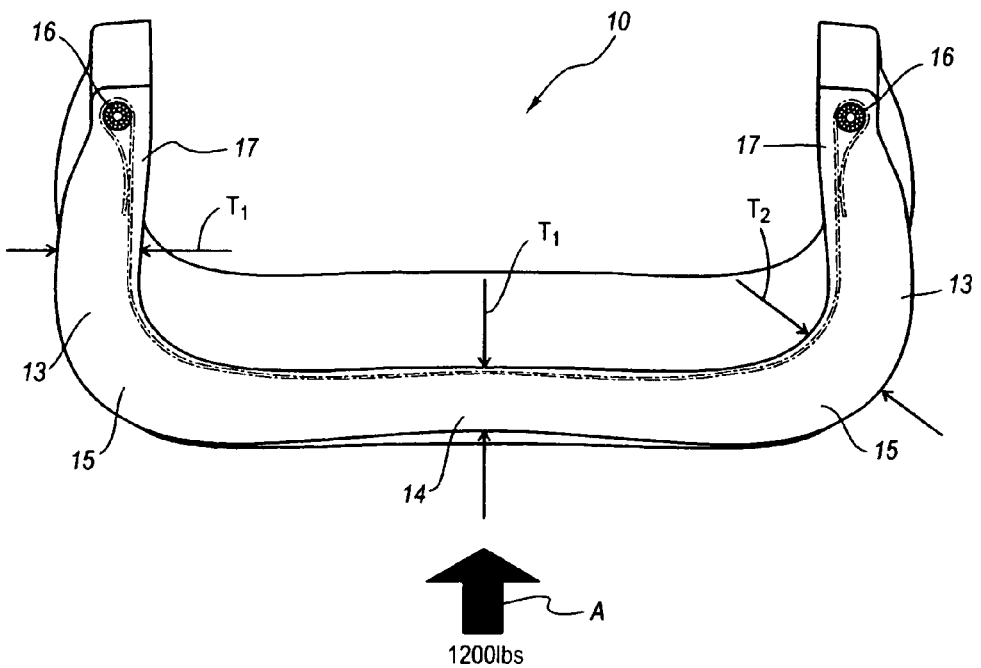
FIG. 3B is a view like that of FIG. 3A showing with large arrow A a force identified as 1200 lbs being applied to the center of the tread portion of the tire.
Figure 3C:
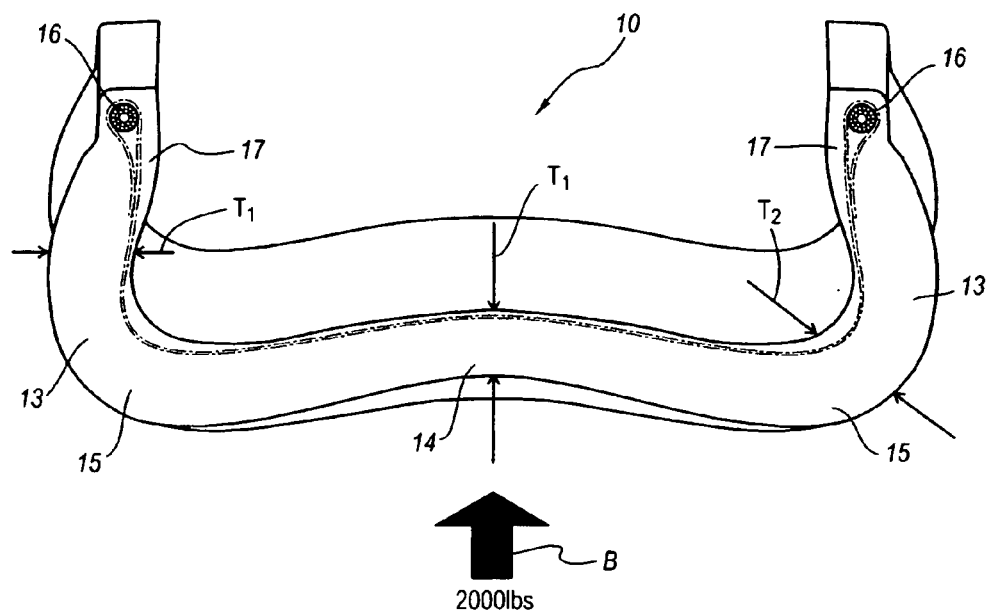
FIG. 3C is a view like that of FIG. 3A showing with large arrow B a force identified as 2000 lbs being applied to the center of the tread portion of the tire.
Figure 3D:
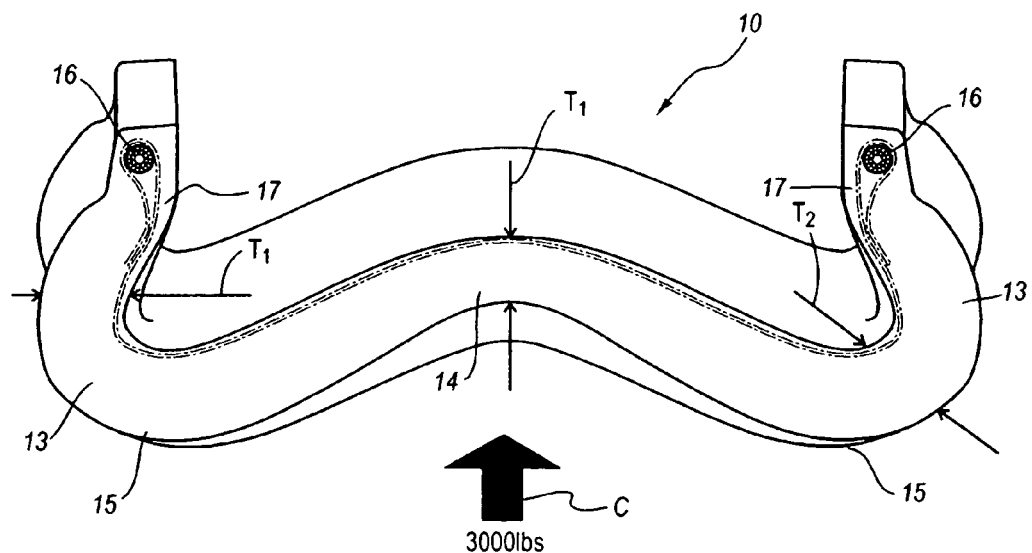
FIG. 3D is also a view like that of FIG. 3A showing with large arrow C a force identified as 3000 lbs being applied to the center of the tread portion of the tire.
Figure 4:
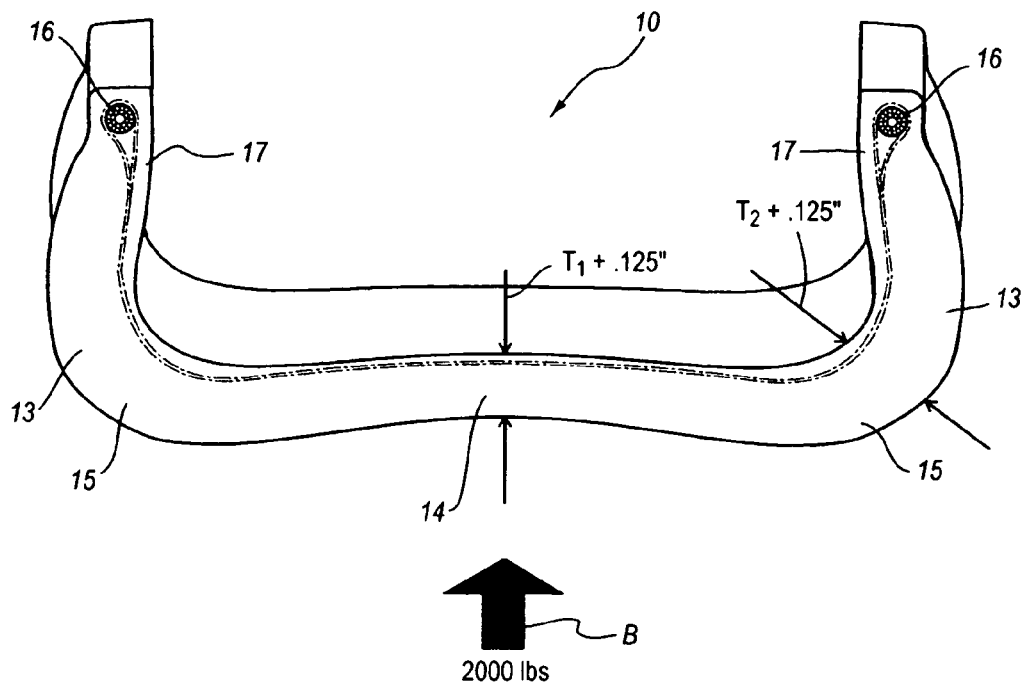
FIG. 4 is a view like that of FIG. 3C only showing a +0.125 as an increase in thickness as having been added to T1 and a +0.125 as an increase is thickness a having been added to T2, straightening the curve as was formed by the force shown as arrow B directed into the center of the tire tread portion.
Figure 5:
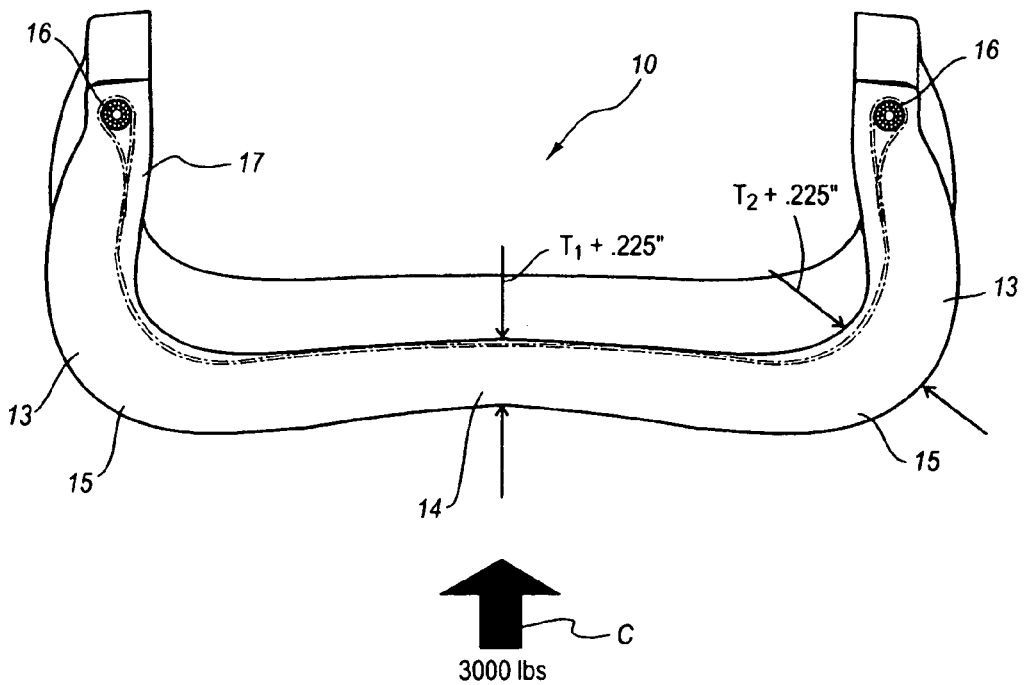
FIG. 5 is a view like that of FIG. 3D only showing a +0.225 as an increase in thickness as having been added to T1 and a +0.225 as an increase in thickness as having been added to T2, straightening the curve as was formed by the force shown as arrow C directed into the center of the tire tread portion.
Figure 8:
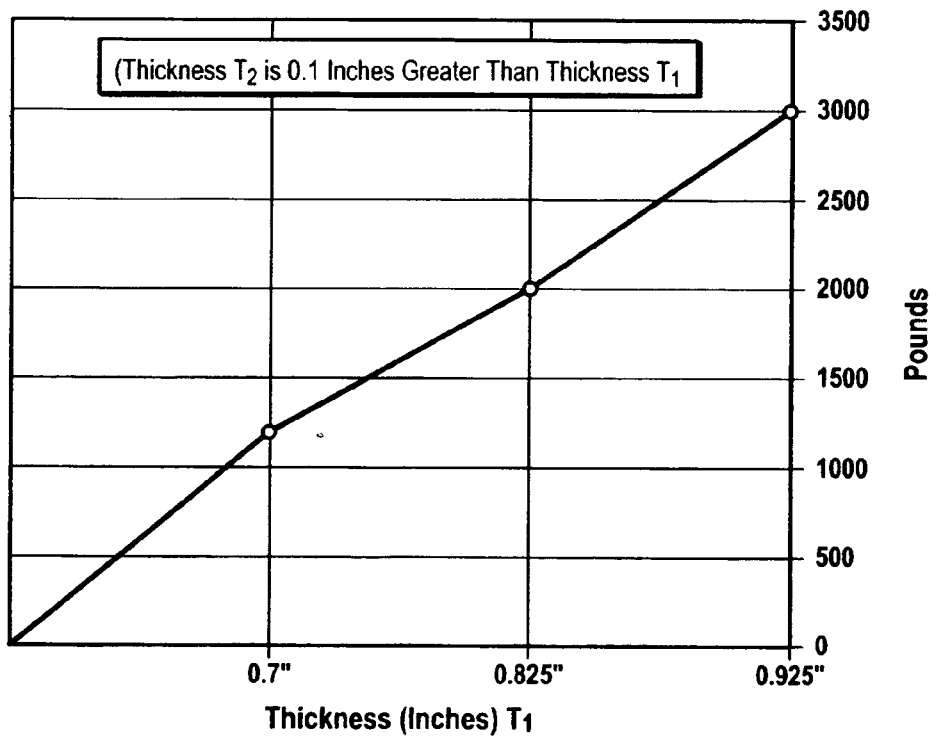
FIG. 8 shows a graph comparing tire side wall thickness to a tire load.
Figure 9:
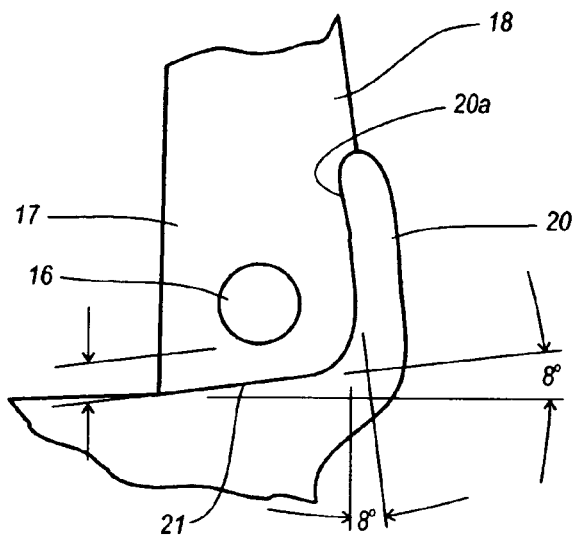
FIG. 9 shows an enlarge side elevation sectional view of bead of the tire of FIG. 6 that is shown fitted into a rim well.

An automobile tire 10 of the invention is shown in FIG. 2 mounted onto a rear wheel rim 12 of a sports car 11, as shown also in FIG. 1. The tire 10 includes a casing or body that is preferably formed from an elastomeric material, such as a urethane material, preferably utilizing spin casting methods like those described in apparatus and method patents, U.S. Pat. Nos. 4,855,096; 4,943,323; 5,906,836 and 6,165,397, that the present inventor is a co-inventor of. Though, it should be understood, the invention could be manufactured from other elastomeric materials, including natural or synthetic rubber, and by other methods and apparatus from that shown in the above set out U.S. patents, to include: molding, where a urethane or rubber material, in a liquid form, is poured into a mold; or by a pressure molding of a rubber material where the material is squeezed, as in a mold, into a tire shape; or a like process or procedure can be employed to form the tire or tires of the invention, within the scope of this disclosure. It should therefore be understood that the invention resides in a unique tire configuration involving an annular interior cavity and its arrangement for mounting the tire 10 on rim 12, as shown in FIG. 3A, including a selection of opposing like tire side walls 13 and area under the tread 14 and shoulder 15 thicknesses providing for load bearing structural strength for supporting a design load, and is not in a particular manufacturing process or material used in that manufacture. As shown, the annular shaped cavity includes equal thicknesses of side walls 13 and area under the tread 14, with the thickness at the tires shoulders 15 being slightly greater. Beads 16 that are inelastic and are continuous loops formed from twisted steel wires are preferably encapsulated in each of the tire side walls 13 ends 17 for mountings the tire side walls bead ends in rim 12, as shown in FIG. 9. So arranged, a 10 tire is provided that will transfer loads as are directed into the tire tread above the area under the tread 14, as a compressive load that is directed through the shoulders 15, into the side walls 13 and into the tire side walls ends 17, that are mounting the tire 10 to the rim 12. Tire 10 load bearing ability is inherent in the structure of the annular cavity of the tire 10, as shown in the frontal view of a view of the tire 10 shown in FIGS. 3A through 5, where the tire side walls 13 and area under the tread 14 have the same thickness, shown as T1 in FIG. 3A, and the tire has a greater thickness T2 across the tire shoulders 15. With, as shown in FIGS. 4 and 5, where loads, shown as arrows B and C, that are greater than the applied load A, shown in FIG. 3B, the tire thickness at the side walls 13 and area under the tread 14, T1, and thickness, T2, at the shoulders 15 is increased to accommodate the increased load. This increase in thickness stabilizes the tires 10, as shown in FIGS. 4 and 5 by the fact that even with the increased loads B and C, the flexure of the area under the tread 14 is like that shown in FIG. 3B for load A. Which relationship of tire sides walls 13 and area under the tread 14 thickness and the thickness around the arc of the tire shoulders 15 is shown is the graph of FIG. 8. In practice, it has been found that, to produce the tire 10 having the load bearing character as shown in the graph, for the tire bearing a load of 1200 pounds of FIG. 3A, the side wall 13 and area under the tread 14 thickness T1 is approximately 0.7 inches and the shoulder 15 thickness T2 is approximately 0.8 inches, plus or minus 0.05 to 0.015 inches. With for the tires of FIGS. 4 and 5 bearing loads B and C, respectively, of 2000 and 3000 pounds, to achieve the tire stability, as shown, the tire side wall 13 and area under the tread 13 and shoulder 15 thicknesses T1 and T2 are each increased by 0.125 inches, approximately, to support a 2000 pound load, and by 0.225 inches, approximately, to support a 3000 pound load.

So arranged, the tire 10 with only bead and without plies and belts will exhibit a load bearing ability sufficient to maintain tire stability even should air under pressure be lost from the tire 10. Even with the air pressure in the tire annular cavity be reduce to atmospheric pressure, the tire 10 will still retain a load bearing capability, allowing the vehicle the tire 10 supports to travel a significant distance at a suitable speed to where the tire can be repaired or replaced. In testing a tire 10 of the invention supported a design load of twelve hundred (1200) pounds at speeds reaching eighty (80) miles per hour with and without air in the annular chamber. In practice, the tire is preferably aired to a pressure of between fifteen (15) to twenty (20) Psi that will provide a load carrying capability and ride like that of a conventional pneumatic tire aired to approximately thirty five to forty Psi. But, should the air be lost from the annular cavity, even to where the tire interior is at atmospheric pressure, the tire 10 will continue to carry the load for a significant distance at a speed of approximately fifty (50) miles per hour.

Heretofore, tires formed with cavities have not utilized a particular shape of cavity like that of the tire 10, where the load bearing ability of the tire is directly related to tire thickness T1 at the tire side walls 13 and across the tread 14 and thickness T2 at the tire shoulders 15, as does the invention. With proper thickness, loads directed into the tire will not destabilize it, with such tire destabilization illustrated by the flexure of the tire tread area 15, as shown in the tires of FIGS. 3C and 3D. However, as shown in FIGS. 4 and 5, by increasing the tire side wall, area under the tread and shoulders, to a proper wall thickness that includes T1 and T2, as shown, the tire 10 will exhibit stability at the greater loads. Under which loading, for a proper thickness of side walls 13, area under the tire 14 and shoulders 15, the loads are directed around the shoulders 15 and into side walls 13 that direct the compressive loads into the rim 12. To maintain the tire 10 to the rim 12, as illustrated in FIG. 9, and in FIGS. 3A through 6, the outer surface of the side walls 13 at the rim engage ends 17 outer surfaces curve inwardly to form a curve shelf 18, that as shown best in FIG. 9, when the tire is fitted onto the rim 12, slides across and compression fits against a rim flange 20, sealing thereagainst. In practice, for mounting the tire 10 having side walls 13 with bead 16 ends 17 onto rim 12, where the encapsulated beads 16 make the tire rim engaging ends are minimally resilient, and it is necessary to encapsulate the bead 16 within the side wall bead end 17 at a distance E from the bead end 21 so as to allow the side wall material to flex sufficiently to allow the tire bead end 21 to pass over the rim 12 flange 20 outer end. In practice, that distance E being approximately 0.09 inches, plus or minus 0.0145 inches. Further, to allow for travel of the tire bead end 17 into the rim 12 to seat, as shown in FIG. 9, the tire bead end 21 is preferably sloped upwardly at approximately an eight (8) degree angle, allowing the tire bead end outer portion to slide over the rim flange 20 end 20a in mounting the tire 10.

Figure 6:
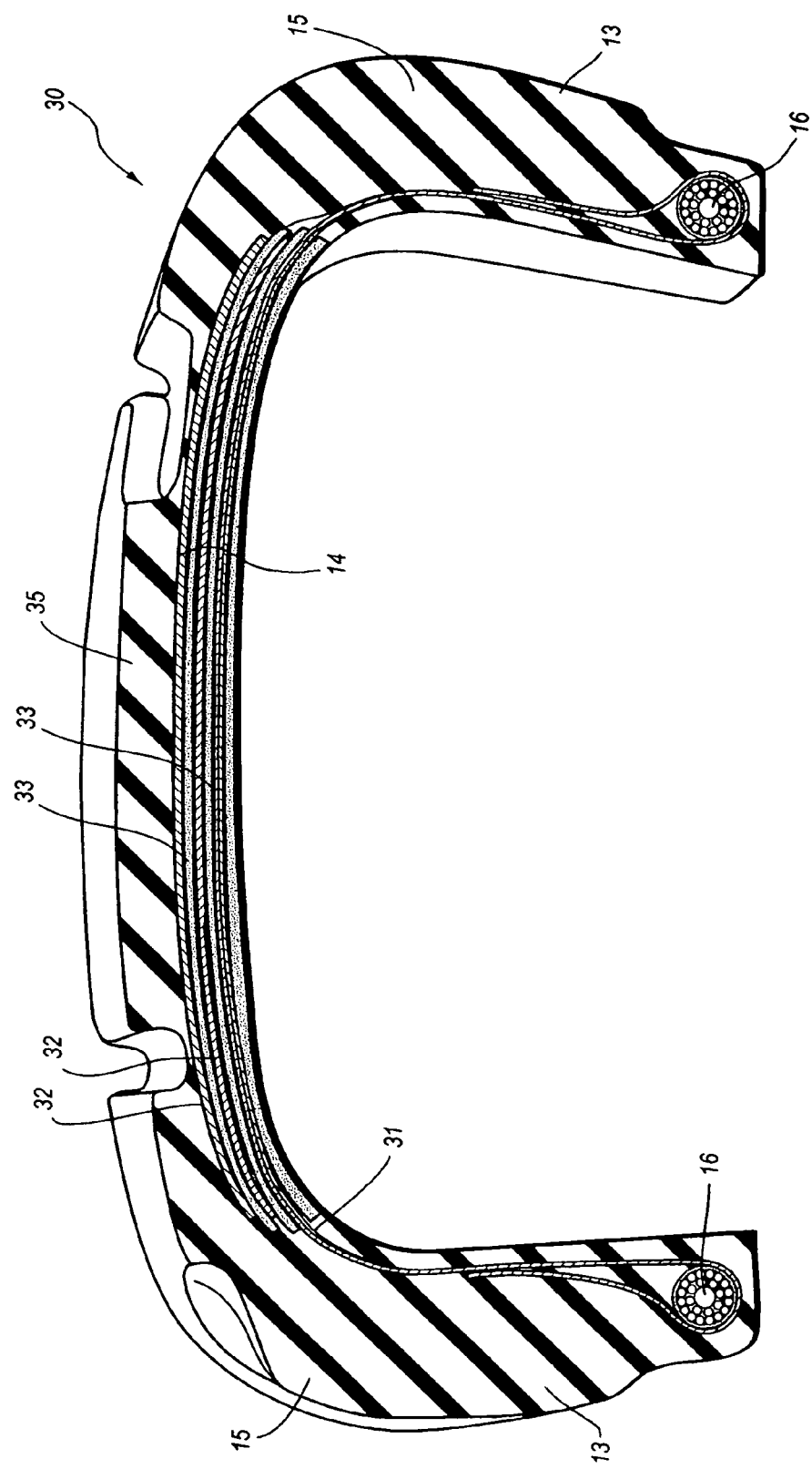
FIG. 6 shows an enlarged section of the tire of FIG. 1 that is indicated by the striping to be formed from an elastomeric material and showing the tire as including plies, belts, with spacers fitted between the layers of plies and belts, and beads, with the top of the tire shown as including a tread.
Figure 7:
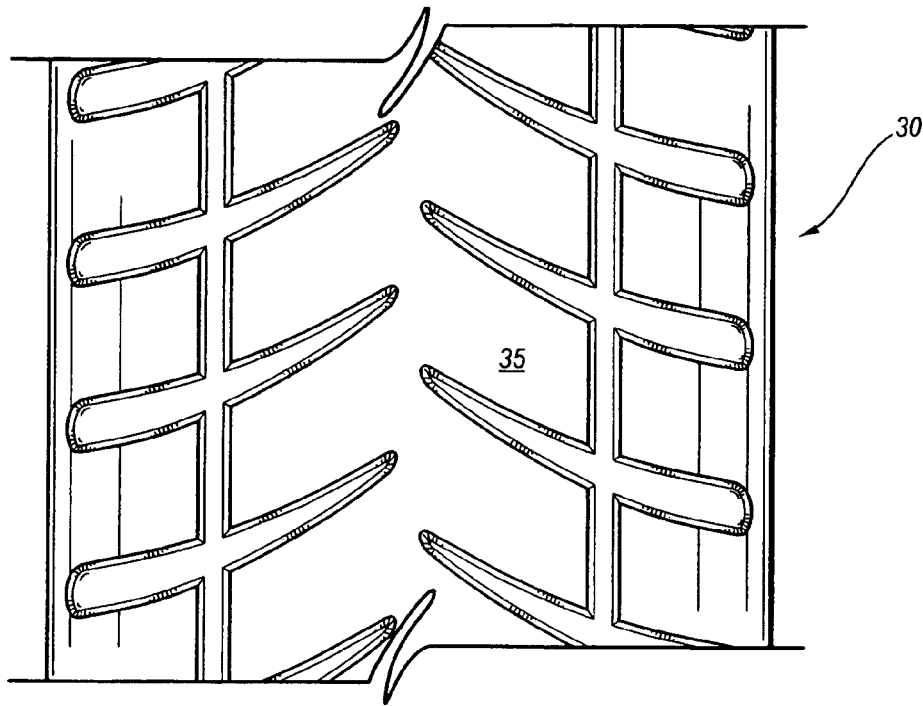
FIG. 7 shows a top plan view of the tread of the tire of FIG. 6.
Figure 10:
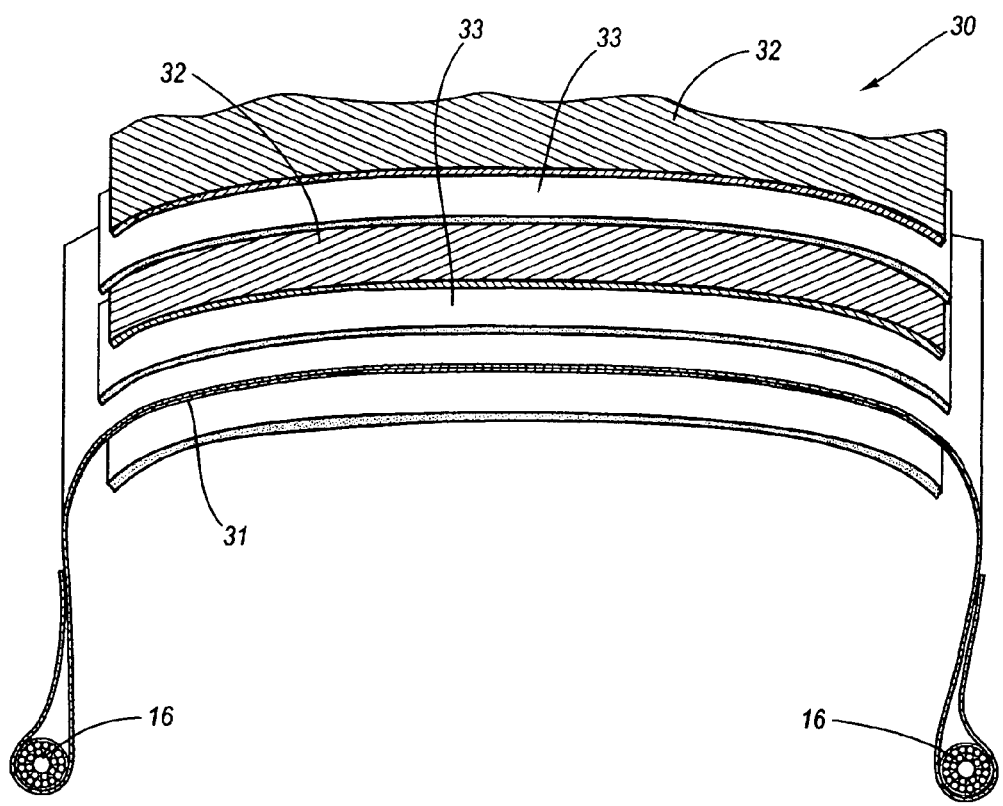
FIG. 10 is an exploded side elevation view of the tire section of FIG. 6.

While tire 10 has functioned on a test vehicle, with and without air, as described above, for conventional operations as a transport tire the tire, it is preferred that the tire include encapsulated plies and belts in addition to the beads 16. A tire 30, as shown in FIGS. 6 and 10, includes this combination of a ply or plies 31 and a belt or belts 32 along with the beads 16 and shows a tread 35 applied thereon, as shown best in FIG. 7. In practice, the plies, belts and beads are encapsulated in the tire 30 during its formation, preferably utilizing spin cast methods as set out above. In which formation process it is necessary to lay up the plies, belts and beads onto a mandrel that, preferably, is part of the tire mold and to then inject a liquid urethane mixture into a mold as it is spun, dispersing the urethane uniformly around the plies, belts and beads, encapsulating them in the formed tire. To induce a uniform travel of the liquid urethane around and between the plies and belts and around the beads it is preferred to provide for separators between the layers of plies and belts that will keep the respective layers separated but will allow a flow or urethane through and around the separators in the tire casting process. In practice, and, as shown best in the exploded view of FIG. 10 of the tire 30 of FIG. 6, a layer or layers of plies 31 are laid up across the tire across the tire from bead to bead, with the plies ends wrapped around the beads 16 and up the tire sides 13. With, where two or more layers of plies are used, spacers 33 that are shown as a layer of porous cotton material. In a practice of the invention, a layer or layers of cotton bandage material have been used as the spacers though, it should be understood, other arrangements or cotton or other fabric material could be so used within the scope of this invention. Similarly, belts 32, that are preferably laid up in a stack to have crossing angles of approximately twenty four (24) degrees, and with each belt separated from the one above and below by a spacer layer 33 that is also preferably a layer of cotton bandage material. In practice it has been found that the plies and belts can be formed as a weave of twisted cotton or rayon thin cord that will slightly absorb the liquid urethane in the spin casting process, providing a strong bond therebetween. Further, it should be understood, the spacers 33 can be other than sections of cloth or fabric material within the scope of this disclosure. For example, spacers formed from pre-cured urethane that, when exposed to the flow of hot urethane in the spin casting process will cure with the injected urethane to become apart thereof, can be fitted as layers or sections between the ply and belts layers. So arranged, in the spin casting process, such pre-cure urethane cures and flows into and between the layers or plies and belts providing a secure bonding therebetween.

Preferred embodiments of the elastomeric tire with arch shaped shoulders of the invention have been shown and described above. It will, however, be apparent to one knowledgeable or skilled in the art that the above described embodiments may incorporate changes and modifications without departing from the general scope of this invention. Which invention therefore is intended to include all such modifications and alterations in so far as they come within the scope of the appended claims and/or a reasonable equivalence thereof.

I claim:

1. An elastomeric tire with arch shaped shoulders comprising, a tire casing formed by casting methods from an elastomeric material to have an interior annular cavity where the side wall and area under the tread are a like thickness selected to support a tire load and which said thickness is approximately 0.1 inch less than the thickness of shoulders separating which said side walls top ends and the ends of the area under the tread; and a pair of continuous inelastic beads, with each said bead encapsulated in a lower end of each said side wall, and with said beads located in said lower end at a selected distance from ends of each said side wall and said lower end is slanted upwardly from an inner side wall edge to an outer side wall edge.

2. The elastomeric tire with arch shaped shoulders as recited in claim 1, wherein the tire casing outer side wall is curved and tapered inwardly from its contact point with a rim upper portion, to close against an outer wall of said rim.

3. The elastomeric tire with arch shaped shoulders as recited in claim 1, further including plies encapsulated in the tire during tire casting that extend around said tire casing and with the plies ends passed around the beads and folded back against themselves.

4. The elastomeric with arch shaped shoulders as recited in claim 3, further including at least one belt that is fitted around the tire circumference, over the plies and is also encapsulated in the tire during tire casting.

5. The elastomeric tire with arch shaped shoulders as recited in claim 4, further including spacers positioned between the layers of plies and belts that are porous to pass urethane therethrough in the casting process and bind to and separating the layers of plies and belts.

6. The elastomeric tire with arch shaped shoulders as recited in claim 5, wherein the belts and plies are formed from rayon cords; and the spacers are layers of porous cotton material.

7. The elastomeric tire with arch shaped shoulders as recited in claim 6, wherein the porous cotton material is bandage material.

8. The elastomeric tire with arch shaped shoulders as recited in claim 1, wherein the inelastic beads are a pair of continuous twisted steel wire loops.

* * * * *